United States Patent
Somasundaram et al.

(10) Patent No.: US 10,084,967 B1
(45) Date of Patent: Sep. 25, 2018

(54) SYSTEMS AND METHODS FOR REGIONALLY CONTROLLING EXPOSURE TIME IN HIGH DYNAMIC RANGE IMAGING

(71) Applicant: QUALCOMM Incorporated, San Diego, CA (US)

(72) Inventors: Kiran Somasundaram, San Diego, CA (US); Mainak Biswas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/469,309

(22) Filed: Mar. 24, 2017

(51) Int. Cl.
| | |
|---|---|
| *H04N 5/235* | (2006.01) |
| *G06T 11/60* | (2006.01) |
| *G06K 9/62* | (2006.01) |
| *G06T 7/13* | (2017.01) |
| *H04N 5/225* | (2006.01) |
| *H04N 5/376* | (2011.01) |
| *G06T 5/00* | (2006.01) |
| *G06T 5/50* | (2006.01) |
| *G06K 9/00* | (2006.01) |

(52) U.S. Cl.
CPC ......... *H04N 5/2353* (2013.01); *G06K 9/6212* (2013.01); *G06K 9/6267* (2013.01); *G06T 5/009* (2013.01); *G06T 5/50* (2013.01); *G06T 7/13* (2017.01); *G06T 11/60* (2013.01); *H04N 5/2256* (2013.01); *H04N 5/2356* (2013.01); *H04N 5/3765* (2013.01); *G06K 9/00791* (2013.01); *G06T 2207/10004* (2013.01); *G06T 2207/20208* (2013.01); *G06T 2207/20221* (2013.01); *G06T 2207/30252* (2013.01); *G06T 2210/12* (2013.01)

(58) Field of Classification Search
CPC ...... H04N 5/335; H04N 5/3535; H04N 5/369; H04N 5/3745; H04N 9/045
See application file for complete search history.

(56) References Cited

U.S. PATENT DOCUMENTS

| | | | |
|---|---|---|---|
| 9,106,850 B2 | 8/2015 | Moore | |
| 9,179,062 B1 * | 11/2015 | Rivard | H04N 5/2256 |

(Continued)

FOREIGN PATENT DOCUMENTS

JP 2009017293 A 1/2009

OTHER PUBLICATIONS

Jang C., et al., "Multiple Exposure Images Based Traffic Light Recognition", IEEE Intelligent Vehicles Symposium, Jun. 8-11, 2014, pp. 1313-1318.

*Primary Examiner* — Amy Hsu
(74) *Attorney, Agent, or Firm* — Paradice & Li LLP

(57) ABSTRACT

Systems and methods are disclosed for detecting light sources and selectively adjusting exposure times of individual sensors in image sensors. In one aspect, a method includes capturing multiple images of a scene using a digital imager. The method includes generating a blended image by combining the multiple images, and executing an object detection algorithm on the blended image to locate and identify objects. The method includes determining a region of the identified object that contains a light source, and generating bounding box data around the light source region. The method includes communicating the bounding box data to the digital imager and updating the exposure time of the sensors in the bounding box region.

24 Claims, 7 Drawing Sheets

(56) References Cited

U.S. PATENT DOCUMENTS

| | | | |
|---|---|---|---|
| 2012/0200734 A1 | 8/2012 | Tang | |
| 2014/0226041 A1* | 8/2014 | Eguchi | H04N 5/23229 |
| | | | 348/239 |
| 2014/0226914 A1* | 8/2014 | Mocanu | G06T 5/003 |
| | | | 382/255 |
| 2015/0219809 A1* | 8/2015 | Ruhnau | H04N 5/35563 |
| | | | 348/360 |
| 2015/0304539 A1 | 10/2015 | Kristensen et al. | |
| 2015/0358552 A1* | 12/2015 | Kobayashi | H04N 5/2355 |
| | | | 348/239 |
| 2016/0065861 A1 | 3/2016 | Steinberg et al. | |
| 2016/0323518 A1* | 11/2016 | Rivard | H04N 5/247 |

* cited by examiner

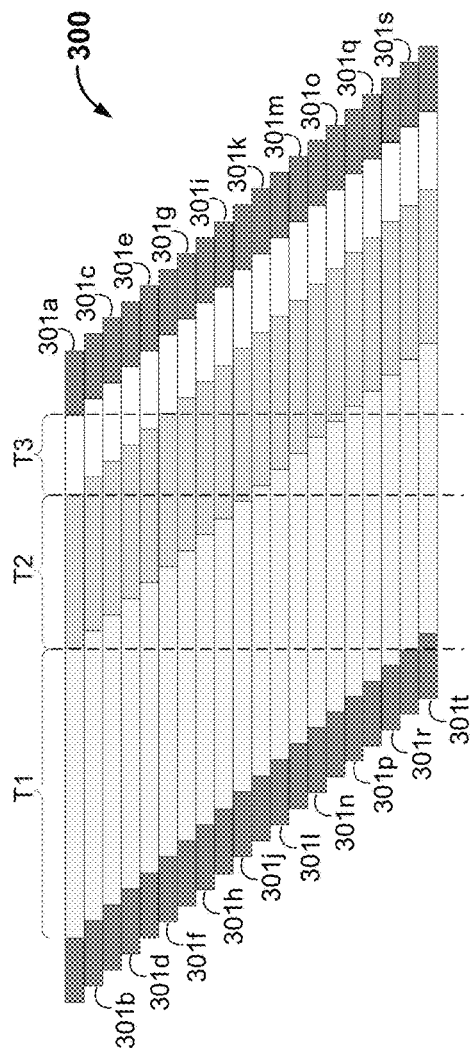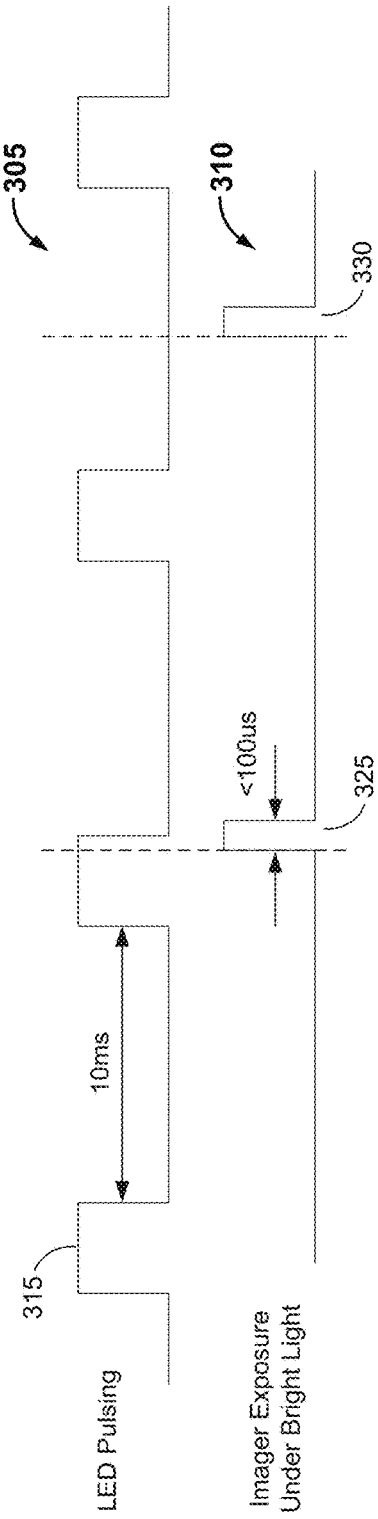

SYSTEMS AND METHODS FOR REGIONALLY CONTROLLING EXPOSURE TIME IN HIGH DYNAMIC RANGE IMAGING

BACKGROUND

Field of the Invention

This disclosure relates to object detection in images and, more particularly, selectively controlling the exposure time of individual sensors based on the location of the object in the image.

Description of the Related Art

High dynamic range (HDR) imaging is a technique used in imaging and photography to reproduce a greater dynamic range of luminosity than is possible with standard digital imaging or photographic techniques. HDR photographs are generally achieved by capturing multiple standard exposure images with different exposure times and merging the captured images to form a single HDR image. Digital images are often encoded in a camera's raw image format because image encoding doesn't offer a great enough range of values to allow fine transitions, introducing undesirable effects due to lossy compression. In most imaging devices, the degree of exposure to light applied to the image sensor can be altered by increasing/decreasing the time of each exposure. The final image is constructed by combining the multiple frames captured at different exposures, wherein different parts of the final image include different combinations of different exposure frames.

The purpose is to present a range of luminance similar to that experienced through the human eye, so that all aspects of an image are clear despite the image having regions of broad luminance value disparity. HDR imaging is a critical requirement for several scientific applications where a scene may contain bright, direct sunlight and extreme shade. For example, cameras, or digital imagers, used on automotive applications may be subject to scenes that can include regions of both significant brightness (e.g., sun, oncoming headlights) and darkness (e.g., under a bridge, parking garage). However, the typical image sensor is activated by rows of sensors (or pixels) in an asynchronous manner. In other words, the rows of the image sensor are activated in succession, which may result in a "rolling shutter" effect in a captured image. The rolling shutter effect may distort features of a scene that are rapidly moving or changing, causing the features to look distorted, partially captured, or not captured at all.

Light emitting diodes (LEDs) are ubiquitous in driving scenarios, and account for the light sources found in traffic lights, traffic sign boards, and tail and head lights in automobiles. LED light sources are typically pulsed at a high frequency, where the pulse width controls the brightness. For example, an LED may pulse to an ON state every 10 ms, where it returns to an OFF state during the 10 ms window of time. As a result, an HDR camera with a short exposure time may capture images of a car or a traffic light, but the images may be captured at a time where the LED light sources is in an OFF state. In such a case, an advanced driving assistance system (ADAS) or a self-driving car system may not recognize that the vehicle in front of it is braking, or that a traffic light has turned red.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly.

One innovation includes an apparatus for regionally controlling exposure time. The apparatus may include a digital imager. The digital imager may include a sensor array comprising a plurality of sensors, each sensor configured to generate a signal responsive to an amount of radiation incident on the sensor, the sensor array further configured to generate a plurality of images, wherein each of the plurality of images are generated under different exposure conditions, and an image signal processor configured to control exposure conditions for each sensor of the plurality of sensors. The apparatus may also include a processor coupled to the digital imager and configured to determine one or more weight values for each image in the plurality of images, combine the plurality of images into a single image based on a ratio of the one or more weight values for each image, determine a number of edges in the single image, the number of edges representing boundaries of objects, identify an object in the single image using the number of edges and an object database, determine a region of sensors of the plurality of sensors corresponding to the identified object, and transmit a first message to the image signal processor, the first message comprising data for adjusting an exposure condition of one or more sensors within with the region of sensors.

For some embodiments, the processor is further configured to generate a bounding box based on the identified object in the single image, and wherein the bounding box comprises at least a portion of the identified object. For some embodiments, the bounding box corresponds to the region of sensors of the plurality of sensors.

Another innovation is a method for regionally controlling exposure time on an image sensor, including generating a plurality of images, via the image sensor, the image sensor comprising a plurality of sensors, wherein each sensor is configured to generate a signal responsive to an amount of radiation incident on the sensor, and wherein each of the plurality of images are generated under different exposure conditions, controlling exposure conditions, via an image signal processor, for each sensor of the plurality of sensors, computing, via a processor, one or more weight values for each image in the plurality of images, combining, via the processor, the plurality of images into a single image based on a ratio of the one or more weight values for each image, determining, via the processor, a number of edges in the single image, the number of edges representing boundaries of objects, identifying, via the processor, an object in the single image using the number of edges and an object database, determining, via the processor, a region of sensors of the plurality of sensors corresponding to the identified object, and transmitting, via the processor, a first message to the image signal processor, the first message comprising data for adjusting an exposure condition of one or more sensors within with the region of sensors.

Another innovation is an apparatus for regionally controlling exposure time, that includes a means for generating a plurality of images, wherein each of the plurality of images are generated under different exposure conditions, a means for controlling exposure conditions of the means for generating, a means for computing one or more weight values for each image in the plurality of images, a means for combining the plurality of images into a single image based on a ratio of the one or more weight values for each image, a means for determining a number of edges in the single image, the number of edges representing boundaries of objects, a means for identifying an object in the single image using the number of edges and an object database, a means for determining a region of sensors of the plurality of sensors corresponding to the identified object, and a means for transmitting a first message to means for controlling exposure conditions, the first message comprising data for adjusting an exposure condition of one or more sensors within with the region of sensors.

For some embodiments, the means for generating is an image sensor, the means for controlling is an image signal processor, the means for computing is a processor, means for combining is the processor, means for determining is the processor, means for identifying is the processor, and the means for transmitting is the processor.

Another innovation is a non-transitory, computer-readable medium comprising instructions executable by a processor of an apparatus, that causes the apparatus to generate a plurality of images, via a sensor array comprising a plurality of sensors, wherein each sensor configured to generate a signal responsive to an amount of radiation incident on the sensor, and wherein each of the plurality of images are generated under different exposure conditions, control, via an image signal processor, exposure conditions for each sensor of the plurality of sensors, determine one or more weight values for each image in the plurality of images, combine the plurality of images into a single image based on a ratio of the one or more weight values for each image, determine a number of edges in the single image, the number of edges representing boundaries of objects, identify an object in the single image using the number of edges and an object database, determine a region of sensors of the plurality of sensors corresponding to the identified object, and transmit a first message to the image signal processor, the first message comprising data for adjusting an exposure condition of one or more sensors within with the region of sensors.

BRIEF DESCRIPTION OF THE DRAWINGS

Various features, aspects, and advantages will become apparent from the description herein and drawings appended hereto. As a person of ordinary skill in the art will understand, aspects described or illustrated for an embodiment may be included in one or more other described or illustrated embodiments, if not impractical for the implementation or function of such an embodiment, unless otherwise stated.

FIG. 3A illustrates a typical image sensor activated by rows of pixels, where each row is read out in a sequential manner.

FIG. 3B illustrates an example pulse sequence of an LED light source compared to a digital imager exposure time under a bright light.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

The examples, systems, and methods described herein are described with respect to techniques for selectively controlling the exposure time of individual sensors of a sensor array or an image sensor, based on the location of an identified object in an image. The systems and methods described herein may be implemented on various types of imaging systems that include a camera, or digital imager, and operate in conjunction with various types of object detection systems. These include general purpose or special purpose digital cameras or any camera attached to or integrated with an electronic or analog system. Examples of photosensitive devices or cameras that may be suitable for use with the invention include, but are not limited to, semiconductor charge-coupled devices (CCD) or active sensors in CMOS or N-Type metal-oxide-semiconductor (NMOS) technologies, all of which can be germane in a variety of applications including: digital cameras, hand-held or laptop devices, and mobile devices (e.g., phones, smart phones, Personal Data Assistants (PDAs), Ultra Mobile Personal Computers (UM-PCs), and Mobile Internet Devices (MIDs)). Examples of object detection systems that may be suitable for use with the invention include, but are not limited to real-time object detection systems based on image processing.

Figure 1:
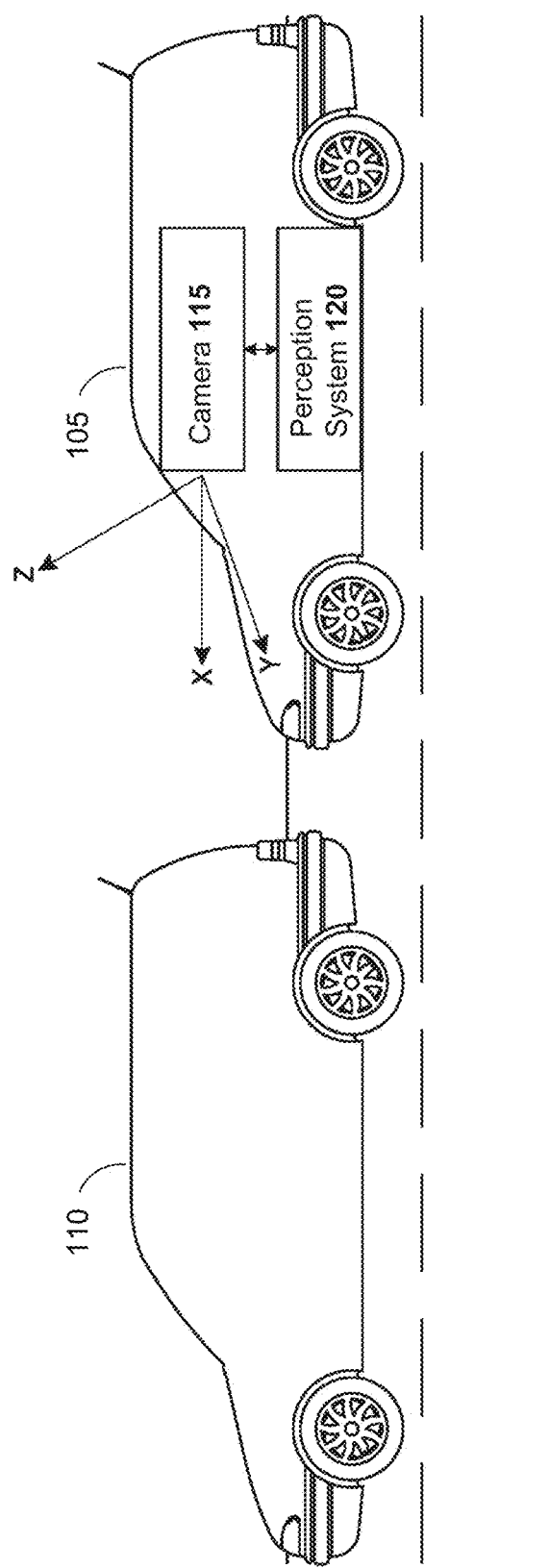
FIG. 1 illustrates an example implementation of a camera system for identifying light sources.

FIG. 1 illustrates an example of a first vehicle 105 and a second vehicle 110. Herein, the second vehicle 110 may also be referred to as another vehicle, or as a plurality of other vehicles. The first vehicle 105 is equipped with an HDR camera and an object detection system that may be used in conjunction with an ADAS or self-driving car application. The first vehicle 105 equipped with the object detection system may include a camera 115 configured to capture HDR and wide dynamic range (WDR) images, and a perception system 120. The camera 115 may be directed so that the lens is facing in the forward direction of the first vehicle 105 for capturing images or frames of the scene in front of the first vehicle 105. It is noted that FIG. 1 is an example representation of one embodiment of the techniques disclosed herein, and should not be read as limiting the placement or direction of the camera, nor application of the camera. For example, the camera may be located inside or outside of the first vehicle 105, and may be directed such that the lens assembly 255 is facing in any direction. For example, the camera 115 may be directed to the rear of the first vehicle 105 for capturing image or frames of the scene behind the first vehicle 105. In another example, the camera 115 and perception system 120 may be equipped in a vehicle other than a car, such as an air vehicle.

Still referring to FIG. 1, a three-axis Cartesian coordinate system is illustrated extending from the camera 115 in the direction a lens assembly 255 of the camera 115 is facing, providing an example of the range of focus of the camera 115. For example, the camera 115 may capture a scene that includes a road and the markers and signs around the road, and other vehicles on and around the road. The camera 115 may be functionally and physically integrated with the perception system 120. For example, the perception system 120 may include a processor for executing an object detection algorithm for detecting objects in frames captured by the camera 115. The perception system 120 may be integrated with the camera 115 using a wireless or wired bidirectional communication implementation. For example, the communication link may include a wired communication link and/or a wireless communication link including Bluetooth or Wi-Fi, or an infra-red (IR) beam communication protocol.

Figure 2:
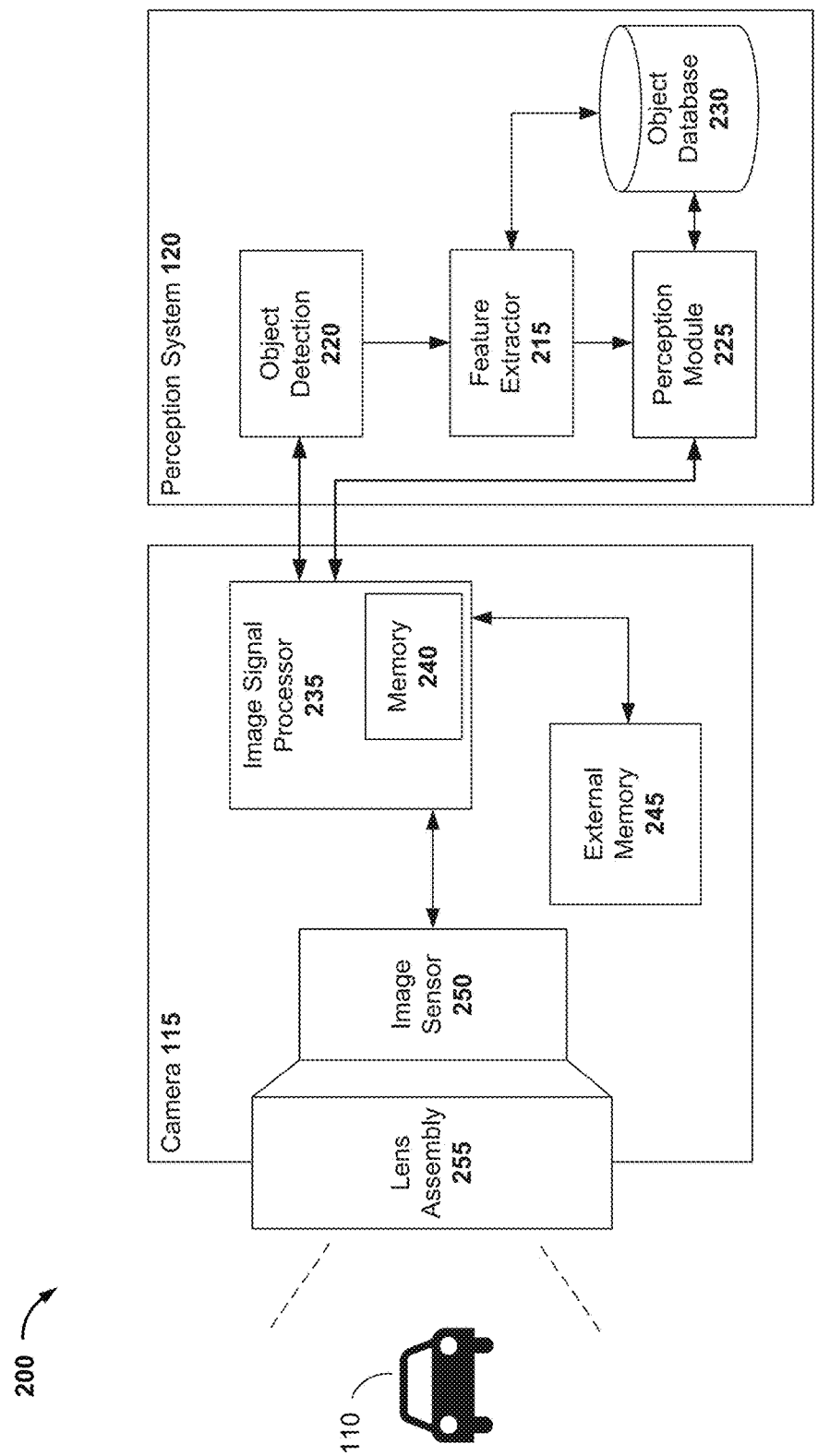
FIG. 2 is a block diagram illustrating an example of a camera system integrated with a perception system.

FIG. 2 is a block diagram 200 illustrating how the camera 115 and perception system 120 may implement techniques in accordance with aspects described in this disclosure. In some examples, the techniques described in this disclosure may be shared among the various components of the camera 115 and the perception system 120.

In the example of FIG. 2, the camera 115 may include a plurality of physical and functional components. The components of the camera 115 may include the lens assembly 255, and image sensor 250, an image signal processor (ISP) 235, an on-chip memory 240, and an external memory 245. In other examples, the camera 115 may include more, fewer, or different components.

Still referring to FIG. 2, the lens assembly 255 captures light from a scene and brings it to a focus on the electrical sensor or film. In general terms, the two main optical parameters of a photographic lens are maximum aperture and focal length. The focal length determines the angle of view, and a size of the image relative to that of an object for a given distance to the object (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera. In one form of typical simple lens (technically a lens having a single element) a single focal length is provided. In focusing a camera using a single focal length lens, the distance between lens and the focal plane is changed which results in altering the focal point where the photographic subject image is directed onto the focal plane. The lens may be of manual or auto focus (AF). The lens assembly 255 provides a structure for containing and positioning one or more camera lenses. The lens assembly 255 may provide a focus control function wherein the lens position is adjusted based on feedback from ISP 235 or a user of the camera. The lens assembly 255 may include an actuator or step motor for adjusting the lens position. The lens assembly 255 may be functionally and/or physically coupled to an image sensor 250.

Still referring to FIG. 2, the image sensor 250 may include a charge coupled device (CCD) or a complementary metal oxide semiconductor (CMOS) sensor. The image sensor 250 includes a sensor array of light sensitive pixels or sensors. Each pixel in the array can include at least one photosensitive element for outputting a signal having a magnitude proportional to the intensity of incident light or radiation contacting the photosensitive element. When exposed to incident light reflected or emitted from a scene, each pixel in the array outputs at least one signal having a magnitude corresponding to an intensity of light at one point in the scene. The signals output from each photosensitive element may be processed to form an image representing the captured scene. Filters for use with image sensors include materials configured to block out certain wavelengths of radiation. To capture color images, photo sensitive elements should be able to separately detect wavelengths of light associated with different colors. For example, a photo sensor may be designed to detect first, second, and third colors (e.g., red, green and blue wavelengths). To accomplish this, each pixel in the array of pixels may be covered with a single color filter (e.g., a red, green or blue filter) or with a plurality of color filters. The color filters may be arranged into a pattern to form a color filter array over the array of pixels such that each individual filter in the color filter array is aligned with one individual pixel in the array. Accordingly, each pixel in the array may detect the color of light corresponding to the filter(s) aligned with it.

FIG. 2 further illustrates the ISP 235 integrated with the camera 115 and the image sensor 250, the lens assembly 255, and the external memory 245. The ISP 235 may be an element of the camera 115, or may be an element associated with an independent system of which the camera 115 is integrated (e.g., the perception system 120). The image sensor 250 may function to measure the light intensity provided by a scene and convert that light into an electronic signal made up of the image statistics for each frame. The image statistics, or raw image data, provided by the image sensor 250 may supply the ISP 235 with the data necessary to process captured image frames. The ISP 235 may control the lens assembly 255 which can adjust the location of the lens in order to focus the scene. Scene focusing can be based on the image sensor 250 image statistics alone or in conjunction with an autofocus algorithm. In an example embodiment, distance and directional movement of the lens assembly 255 may be based on direction provided by the autofocus algorithm which may include a contrast detection autofocus. The contrast detection autofocus can make use of the image statistics by mapping them to a value that represents a lens position or, alternatively, may position the lens in non-discrete, ad-hoc positions. The ISP 235 may be coupled to the lens actuator and may adjust the lens based on calculations made with the image information from the at least one image sensor. The ISP 235 may control the image sensor 250 exposure period. For example, the ISP 235 may adjust the exposure period of the image sensor 250 based in part on the size of the aperture and the brightness of the scene. The ISP 235 may also adjust the exposure period on a per-pixel or per-sensor basis, using data provided by the perception system 120. For example, the processor may allow certain sensors or regions of sensors to collect light for a longer or shorter period of time than other pixels.

Still referring to FIG. 2, the ISP 235 may include an on-chip memory 240 integrated with the processor hardware and directly accessibly by the ISP 235. The memory 240 may be a random access memory (RAM) chip, a read-only memory, or a flash memory, and may contain instructions for the ISP 235 to interface with the image sensor 250, the lens assembly 255, the external memory 245, and the perception system 120. The external memory 245 may also store information regarding the type of processor, auto focus algorithms, and store captured images. In one embodiment, the external memory 245 may be a fixed piece of hardware such as a random access memory (RAM) chip, a read-only memory, and a flash memory. In another embodiment, the external memory 245 may include a removable memory device, for example, a memory card and a USB drive.

Still referring to FIG. 2, the camera 115 may be integrated with the perception system 120. The perception system 120 may include a plurality of functional components. The functional components of the perception system 120 may include an object detection 220 module, a feature extractor 215 module, a perception module 225, and an object database 230. The feature extractor 215, object detection 220, and the perception module 225 may all be executed on a single processor, or may be executed by individual processors functionally and/or physically integrated together. The object database 230 may be a memory including a RAM chip, a read-only memory, and a flash memory. In another embodiment, the object database 230 may include a removable memory device, for example, a memory card and a USB drive.

The camera 115 may be integrated with the first vehicle 105 and configured to capture images of a scene outside of the first vehicle 105. Raw image data captured by the image sensor 250 may be processed by the ISP 235. In one embodiment, the raw image data may be communicated to the feature extractor 215 of the perception system 120. For example, the ISP 235 may execute an image combine function to combine a number of captured images into one HDR image 435, then communicate the HDR image 435 to the feature extractor 215. In one example embodiment, the raw image data of the number of captured images is combined to form a single HDR image 435 using sequential exposure change, or other techniques such as interpolation. In one example embodiment, the camera 115 may sequentially capture multiple images of the same scene using different exposure times. The exposure for each image may be controlled by either varying the f-number of the lens assembly 255 or the exposure time of the image sensor 250. A high exposure image will be saturated in the bright regions of the captured scene, but the image will capture dark regions as well. In contrast, a low exposure image will have less saturation in bright regions but may end up being too dark and noisy in the dark areas.

FIG. 3A illustrates a functional representation 300 of the image sensor 250 capturing a scene at three different exposure times (T1, T2, T3) to generate the HDR image 435. Exposure time may also be referred to as "exposure condition" herein, although exposure conditions may also include other conditions such as lens position, aperture settings, and other camera and other hardware parameters that may affect the exposure conditions of the image sensor. Each row of sensors 301a-301t is illustrated offset from the previous row to indicate a time delta caused by the sequential manner in which each row of the image sensor 250 is read out. This sequential read out often causes a "rolling shutter" effect that distorts objects and creates artifacts in the images. For example, the human eye does not detect the intervals at which an LED light is pulsed on and off, but a camera with a fast exposure time may miss the LED pulse. The problem becomes pronounces in brightly illuminated scenes, where a short (T2) or very short (T3) exposure time is used by the HDR camera to construct the combined scene. Hence, exposure time T1 may be used by certain regions of the image sensor 250 in order to completely capture the LED pulse. The exposure condition can be determined by a processor based on the amount of light in the scene, and/or based on a pre-configured set of parameters, including exposure time.

FIG. 3B illustrates an example LED light source timing sequence 305 and an image sensor 250 exposure time 310. The ON state 315 of the LED pulse is represented by four square waves, or clock cycles. In one example of an LED light source, there may be a delay between sequential ON states. For example, the delay may be on the order of miliseconds (e.g., 10 ms). The exposure time 310 includes two period of image sensor 250 exposure (325, 330). The duration of each period of exposure time may depend on the light available in the scene. For example, the exposure time may be 100 µs or less for a brightly lit scene, or a scene with brightly lit regions. The first exposure time 325 captures a piece of an LED pulse. In such a situation, the image may appear distorted, or the light source may appear dim and partially lit. The second exposure time 330 falls in between two LED ON states. In such a situation, the light source appears off. As such, the duration of the exposure of the image sensor 250 may preclude capturing an image while the LED light source is in an ON state. Hence, the method illustrated in FIG. 3A may be used to consecutively capture a number of images over a period that will ensure at least one image of the number of images will capture the LED light source in an ON state.

Figure 4A:
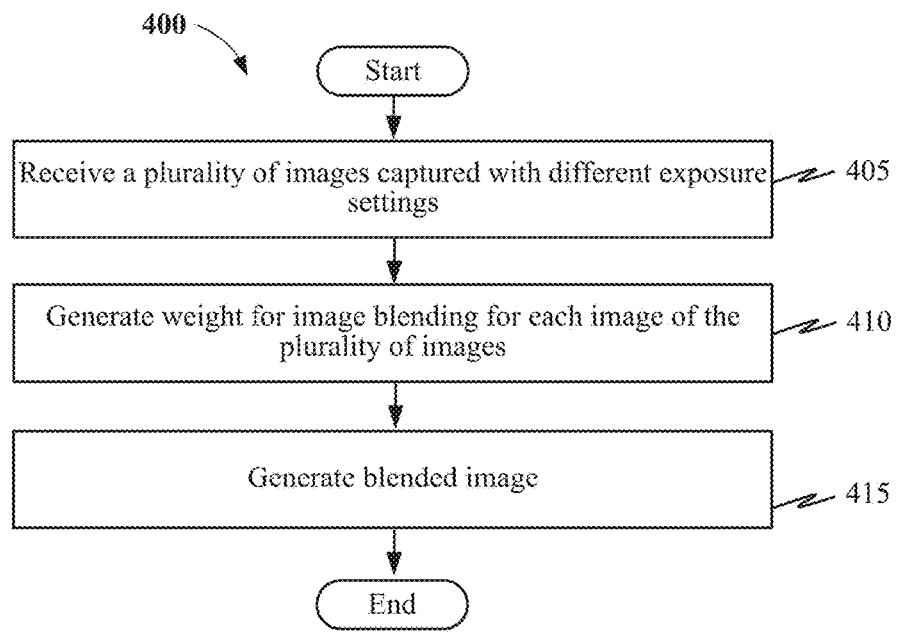
FIG. 4A is a flowchart that illustrates the steps for generating a single HDR image.

FIG. 4A illustrates an example method for blending a plurality of images 400 taken at different exposure settings to generate the HDR image 435. In one example embodiment, the ISP 235 may receive a number of images (405), the number of images captured with different exposure settings. The ISP 235 may then generate one or more weight values for image blending for each image of the plurality of images (410). For example, a weight value accorded to each image may affect its gradation level, or the degree of impact the image has in the HDR image 435 when combined with other images. In one embodiment, the ISP 235 may adjust the weights α and β to generate the HDR image 435 according to a perception measure (e.g., brightness, edges of a degree of saliency, smoothness, length, etc.). The ISP 235 may generate (415) a blended image based on the weights calculated for each image being blended. For example, where data of a short-exposure image 425 is represented by SEI, data of a long-exposure image 430 is represented by LEI, and characteristic functions corresponding to gradation optimization (histogram optimization and the like) of the respective images are represented by f(·) and g(·) respectively, then blended image data (HDRI) according to an exemplary embodiment may be calculated as follows:

$$\text{HDRI} = \alpha \cdot f(\text{SEI}) + \beta \cdot g(\text{LEI}) \qquad \text{Equation 1}$$

Where α and β may represent weights which are applied to blend images, and by differentiating the weights α and β, a range of representable gradation levels may be adjusted. In another embodiment, a merging weight value may be computed for each pixel location of each of the plurality of images captured. The weight value of each pixel in an image of the plurality of images may be determined based on the weight computed for the other images in the plurality of images, or the weight value can be determined by applying pre-determined weight values stored in the on-chip memory 240 or external memory 245.

In some embodiments, the HDR imaging is performed by the ISP 235 as illustrated in FIGS. 2 and 3B. The ISP 235 may be configured to receive image data comprising image data from a set of image frames. As used herein, a set of image frames may correspond to a plurality of images captured of the same scene but having different exposure conditions.

In some embodiments, the ISP 235 may be implemented in hardware as a single-path system with limited memory. As such, image data from the set of image frames may be received as a bitstream and processed by the system as it is received. The system will only have access to a small portion of each image frame of the set of image frames at any given time, without the ability for the system to refer to other portions of the image frames.

In order to perform HDR imaging, the ISP 235 analyzes the received image data to produce the HDR image 435. For example, for portions of the image frame with high luminosity (e.g., due to direct sunlight), pixels from an image frame having lower exposure time may be used, because image frames having higher exposure times may be saturated in those portions of the image frame. On the other hand, for portions of the image frame with low luminosity (e.g., due to being in shadow), pixels from an image frame having higher exposure time may be used. As such, for each portion of the HDR image 435, appropriate image data from the set of image frames is selected, such that the HDR image 435 is able to capture both high and low luminosity ranges while avoiding saturation (e.g., due to high exposure times) and unnecessary noise (e.g., due to low exposure time).

Figure 4B:
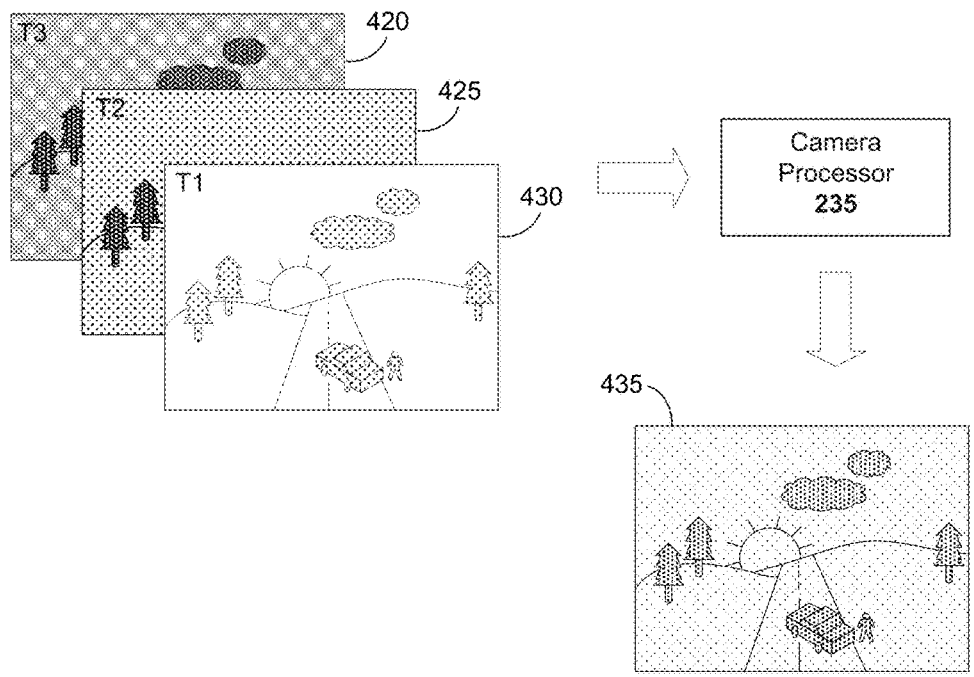
FIG. 4B illustrates an example implementation of an HDR image blender for combining multiple images to generate a single image.

FIG. 4B illustrates an exemplary method of generating a single image from multiple images taken at different levels of exposure. The camera 115 may capture a number of images of a scene, and the ISP 235 may combine the images to create a single HDR image 435. For example, three images are captured at differing levels of exposure: a long-exposure image 430 (T1), a short-exposure image 425 (T2), and a very short-exposure image 420 (T3). The ISP 235 receives the three images and blends the images to generate the HDR image 435. The images may be combined based on a ratio of image parameters in each of the images as compared to a reference image. For example, the reference image may be the short-exposure image 425 (T2). The image parameters may include characteristics of each image, including but not limited to, contrast, saturation, color, brightness, hue, and chrominance and luminance components. FIG. 4B illustrates an example and should not be used to limit the disclosed techniques to combining only three images. For example, the ISP 235 may receive and blend any number of images. In an alternative embodiment, the feature extractor 215 of the perception system 120 may blend the number of images and generate the HDR image 435 instead of the ISP 235.

The ISP 235 may include an auto-focus algorithm, and may control the lens position using the lens assembly 255 according to the auto-focus algorithm. Generally, contrast detection algorithms evaluate the image statistics received from the image sensor 250 at a number of lens positions, and determine if there is more or less contrast at each position relative to the other positions. If contrast has increased, the lens is moved in that direction until contrast is maximized. If contrast is decreased, the lens is moved in the opposite direction. This movement of the lens is repeated until contrast is maximized. In one exemplary embodiment, the lens assembly may be activated to focus the lens on a particular scene by employing algorithms of at least one of three specific types of contrast detection: (1) exhaustive autofocus, (2) slope predictive autofocus, and (3) continuous autofocus. Contrast detection autofocus makes use of a focus feature that maps an image to a value that represents the degree of focus of the image, and iteratively moves the lens searching for an image with the maximal focus according to the contrast detection algorithm. In one example, the ISP 235 may determine which contrast detection autofocus algorithm may be the most appropriate for a given scene or application, and select it to be used. Alternatively, the ISP 235 may determine the appropriate algorithm based on image sensor 250 information. For example, the type of image sensor, the number of light sensitive surfaces on each sensor, etc. The ISP 235 may actuate the lens using the lens assembly to adjust the position of the lens using a digital lookup table with a range of lens positions that correspond to a calculated disparity value. The lookup table may be stored in the memory 240. The camera may adjust position of the lens using one or more contrast detection auto focus algorithms.

Figure 5:
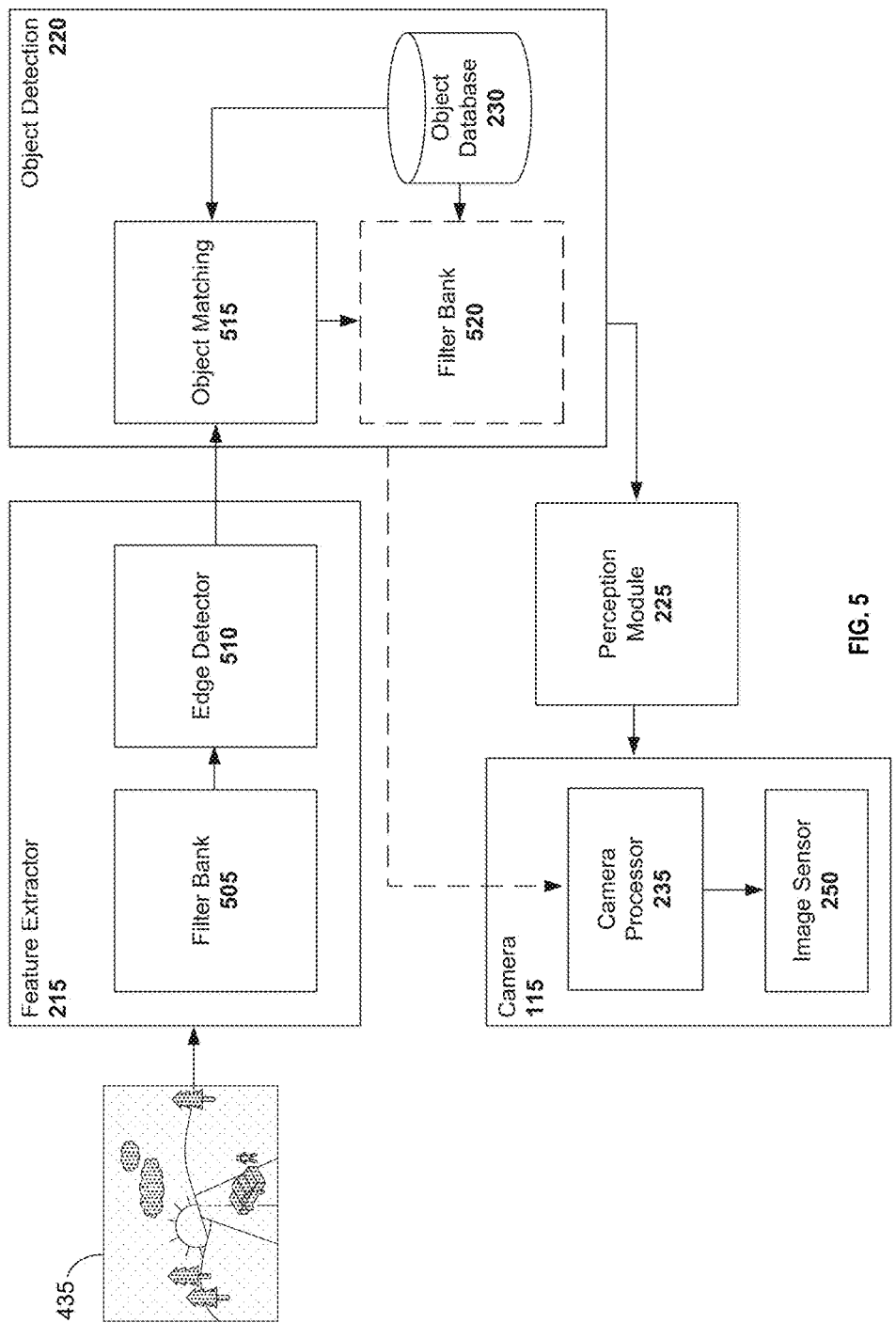
FIG. 5 is a block diagram illustrating an example implementation of the perception system and the camera system.

FIG. 5 is a block diagram illustrating an example of the perception system 120 that may implement techniques in accordance with aspects described in this disclosure. The perception system 120 may be configured to perform some or all of the techniques of this disclosure. In some examples, the techniques described in this disclosure may be shared among the various components of the perception system 120 and the camera 115. In some examples, additionally or alternatively, a processor (not shown) may be configured to perform some or all of the techniques described in this disclosure. The processor may include the image sensor array as an ISP, but can also include an application processor or other external general processor.

In the example of FIG. 5, the feature extractor 215 includes a plurality of functional components. The processes and filters that are executed on the image data by the feature extractor 215 can enable the object detection 220 system to accurately and effectively derive a number of edges and edge-related information from received image data. Each edge may represent a boundary of an object with respect to a scene surrounding the object. The functional components of the feature extractor 215 include a filter bank 505 and an edge detector 510. In other examples, the feature extractor may include more, fewer, or different functional components.

Still referring to FIG. 5, the filter bank 505 may be a portion of physical memory included on a processor, for example, a video processing unit or a general processing unit, and memory, collectively configured to manage communications and execution of tasks. The filter bank 505 may include a stored set of filters for smoothing the image or filtering the image for noise. In one embodiment, the filter bank 505 may include an implementation of a Gaussian filter and a Sobel filter. It is contemplated that other smoothing, blurring, or shading filters can be used by the feature extractor 215. The HDR image 435 data is first applied to the filter bank 505 to create a blurred image. Such blurring reduces image noise and reduces details in the raw image data. Thus, applying the HDR image 435 to the filter bank 505 has the effect of reducing the detection of weak or isolated edges. In another embodiment, the feature extractor 215 may be utilized to detect and identify edges in the long-exposure image 430, the short-exposure image 425, and the long-exposure image 430 before combining the images.

Still referring to FIG. 5, the edge detector 510 may be a portion of physical memory included on a processor, for example, a video processing unit or a general processing unit, and memory, collectively configured to manage communications and execution of tasks. In some embodiments, the feature extractor 215 uses an edge detector 510 to perform an edge detection algorithm on the blurred image to detect edges in the image. In another embodiment, the edge detector may perform the edge detection algorithm on the HDR image 435 prior to, or without, passing the HDR image 435 through a filtering system. In one example embodiment, an implementation of a Canny edge detection algorithm may be used to detect and single out prominent edges in the image. It is contemplated that other edge detection algorithms can be used by the feature extractor 215. In a non-limiting example, a Canny-Deriche detector algorithm and a differential edge detector algorithm can be used. The edge detector 510 may generate data that includes edge data and edge location in the HDR image 435.

In the example of FIG. 5, the object detection 220 module includes a plurality of functional components including an object matching 515 module, an object database 230, and an optional filter bank 520. In other examples, the feature extractor may include more, fewer, or different functional components.

Still referring to FIG. 5, the object matching 515 module may be a portion of physical memory included on a processor, for example, a video processing unit or a general processing unit, and memory, collectively configured to manage communications and execution of tasks. The object matching 515 algorithm may include an algorithm for matching an object shape in the object database 230 with the edges in the HDR image 435 determined by the feature extractor 215 received by the object detection 220 module. For example, a scene captured by the camera 115 may include the second vehicle 110. The object database 230 may include a plurality of shapes, any number of which may be substantially similar to the calculated edges of the second vehicle 110. An object matching algorithm may determine a shape in the object database 230 that most closely resembles the calculated edges of the second vehicle 110. The object database may include attributes associated with each shape such that each shape can be identified. For example, a vehicle such as a car or truck can be identified based on its shape, and be distinguished from a traffic light or a construction sign, both of which are also identified based on their shape. Shape identification can alter the way that the images are generated. For example, the shape of a car or truck can indicate a moving object that may remain in the scene for longer than a stationary object such as a traffic light or street sign. As such, identification of the object can trigger a calculation of gradients of movement of the object based on the identity of the object. Identification of the object may also include identifying the presence of an object without determining a specific object. In some embodiments, the object matching 515 algorithm detects shapes in the image created by the edges based on one or more criterion including the perception measure, length of an edge or its associated curves, a number of overlapped edges, location in the image, depth information, camera location information, or other available information. For example, the camera 115 may be calibrated to capture a center of a lane in the middle of an image frame, and the shoulders of the lane in the left and right periphery of the image frame. In such an example, the object matching 515 algorithm may detect shapes based on expected shapes in those areas of the image frame. In one example embodiment, the object matching 515 algorithm detects shapes in the image based on motion detection of the object. For example, the motion of an object may be detected by obtaining a plurality of images of an object over a period of time, identifying the object, and calculating gradients of movement of the object based on the plurality of images.

In one embodiment, upon determining a shape in the object database 230 that most closely resembles the calculated edges, the object matching 515 algorithm may generate a first bounding box 605 around each of the objects in the image where the first bounding box 605 has a height (h) and width (w) measured in pixels. Each bounding box may represent a region of sensors in the sensor array. Each bounding box may be generated based on the geometry of the objects, other types of image descriptors (e.g., SIFT, BRISK, FREAK, etc.), or other parameters. In an optional embodiment, the object detection 220 module may provide any number of bounding boxes to the camera 115. In such an embodiment, the ISP 235 may communicate a command to the image sensor 250 to modulate the exposure settings of the sensors of the bounding box and the sensors within the bounding box. For example, the ISP 235 may direct the image sensor to increase the exposure time of the sensors within the bounding box to a time greater than the exposure time of other sensors in the image sensor 250. The object detection 220 module may include an optional filter bank 520. Once the edge data is received from the feature extractor 215, may perform the steps of reducing false positives and verifying the object match.

In the example of FIG. 5, the perception module 225 may be a portion of physical memory included on a processor, for example, a video processing unit or a general processing unit, and memory, collectively configured to manage communications and execution of tasks. The perception module 225 may determine areas of the detected objects that may include an LED light. For example, a traffic light and a vehicle with taillights may be captured in an image frame, and the object detection module may detect the object of the traffic light and the vehicle based on the edge detector 510 data. The perception module 225 may determine areas of the detected objects that may include LED lights. The perception module may generate a second bounding box 610 around each of the areas that may include an LED light in the image where the second bounding box 610 has a height (h) and width (w) measured in pixels. Each bounding box may be generated based on the geometry of the objects, other types of image descriptors (e.g., SIFT, BRISK, FREAK, etc.), or other parameters. In an example embodiment, the perception module 225 may provide any number of bounding boxes to the camera 115. In such an embodiment, the ISP 235 may communicate a command to the image sensor 250 to modulate the exposure settings of the sensors of each bounding box and the sensors within each bounding box. For example, the ISP 235 may direct the image sensor to increase the exposure time of the sensors within the bounding box to a time greater than the exposure time of other sensors in the image sensor 250. This allows the image sensor 250 to capture image frames that include the light created by the LED, and avoid capturing image frames during the off phase of the LED.

Still referring to FIG. 5, the perception system 120 may generate a clock cycle that cycles from an ON state to an OFF state in sync with the LED pulse of an outside light source captured by the camera 115. For example, once the outside light source is detected, the perception system 120 may determine the ON/OFF state cycles based on the images captured of the light source. The perception module 120 may provide the clock cycle to the ISP 235 so that the ISP 235 may expose the image sensor 250 during the ON state of the outside light source. In another example, the ISP may expose one or more regions of the image sensor 250 at the rate of the clock cycle. In this configuration, the camera 115 captures images in sync with the outside light source so that the images are not captured during an OFF cycle of the LED pulse of the outside light.

Figure 6:
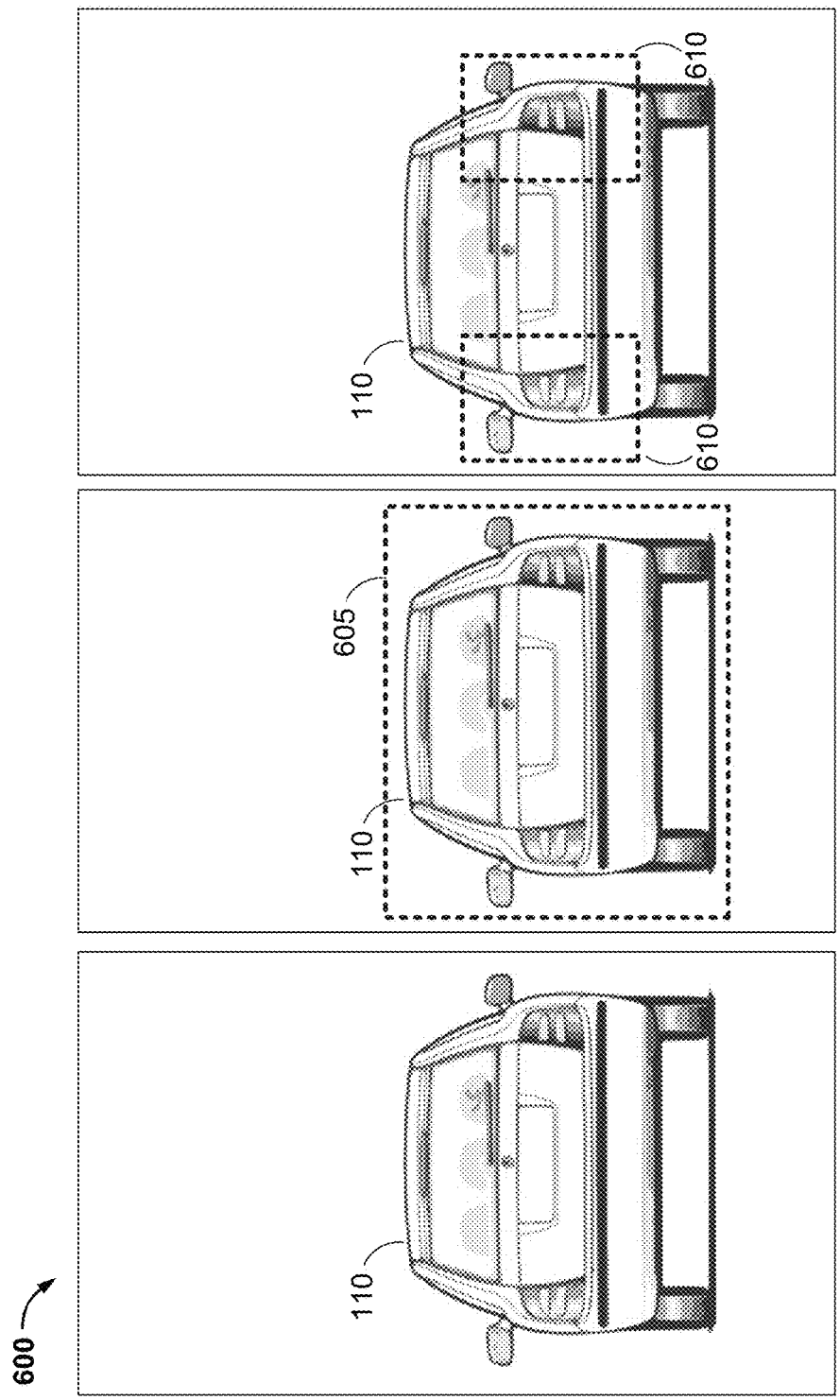
FIG. 6 illustrates varying degrees of generated bounding boxes at different stages of object detection.

FIG. 6 illustrates an example of bounding box operations 600. The second vehicle 110 is captured in an image frame. The vehicle is detected through edge detection and object detection algorithms, and a first bounding box 605 is generated around the detected object. LED light sources are determined by the perception module 225 and a second bounding box 610 is generated around the LED light sources. This embodiment offers the benefit of two sources of bounding boxes for increasing sensor exposure time in image sensors 250. In the event that the perception module cannot determine an LED source, the first bounding box 605 may be used to determine sensor exposure time. It is contemplated that other embodiments may include only one source of bounding box from either the object detection 220 module or the perception module 225.

Figure 7:
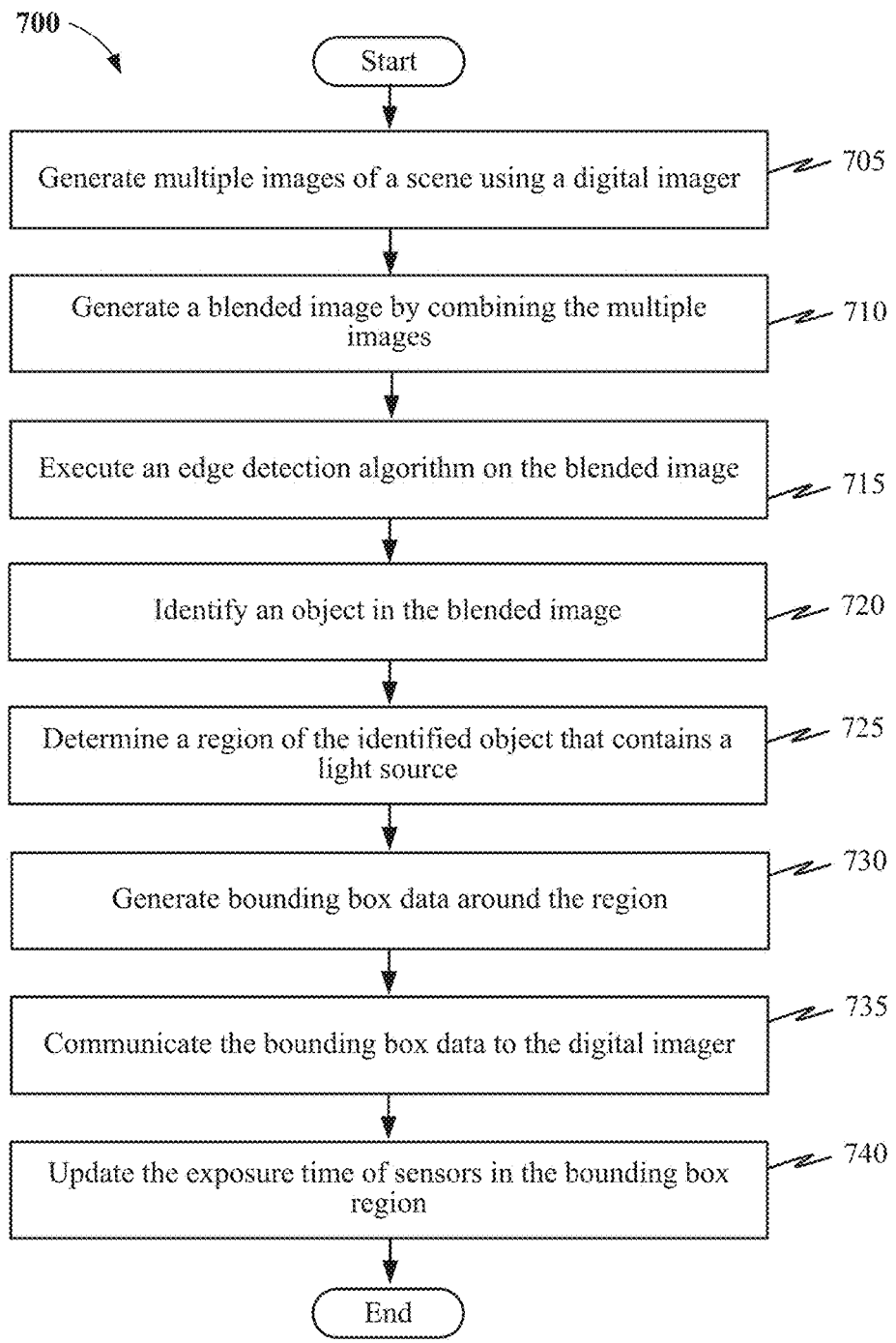
FIG. 7 is a flowchart that illustrates the steps for implementing a camera system and perception system for identification of light sources.

FIG. 7 is a flow chart that illustrates an example method 700 of detecting LED light source regions in a captured image. At block 705, the method 700 captures multiple images of a scene using the camera 115. In some implementations, the camera 115 may include an image sensor 250. In some implementations, the multiple images are each captured consecutively at differing exposure times.

At block 710, the method 700 generates the HDR image 435 by combining, or blending, the multiple images. For combining the images, each image of the multiple images may be accorded a weight value, where the weight value assigns the effect each image has on the blended, HDR image 435.

At block 715, the method 700 executes an edge detection algorithm on the HDR image 435 in order to calculate and define the edges. The blended image is ideal for edge detection because by blending the multiple images into the HDR image 435, the edges have greater definition. In some embodiments, the feature extractor 215 may apply the edge detection algorithm to one or more of the multiple images prior to generating the blended image. In this configuration, the edges can carry over to the blended image.

At block 720, the method 700 identifies an object in the image. In some implementations, a number of objects may be detected in the image using the detected edges. In some implementations, the objects detected are defined by an object database, and are matched using the object matching algorithm. In such an implementation, the object matching algorithm may identify objects based on the edges in the image and the objects stored in the object database 230 by comparing the shapes formed by the edges.

At block 725, the method 700 determines a region of the identified object that contains a light source. In some implementations, the method 700 may use an object database to determine regions of the detected objects that may contain a light source. For example, the object matching algorithm may identify objects based on the edges in the image, and the identified objects may contain characteristics. In this implementation, the characteristics may include regions of the identified objects that may contain light sources. For example, the HDR image 435 may contain edges that form a rectangle that includes three circular shapes that are vertically aligned, similar to a traffic light. The object database 230 may include the shape, as well as associated characteristics that include light sources at each of the three circular shapes. In such a configuration, the perception module 225 may increase the exposure time of regions of sensors in the image sensor 250 that correspond to the regions of the three circular shapes that have the light source characteristic. In another implementation, the perception module 225 may increase the exposure time of regions of sensors in the image sensor 250 that correspond to one or more bounding boxes containing the regions of the three circular shapes that have the light source characteristic.

At block 730, the method 700 generates a bounding box around one or more regions that may contain a light source. In some implementations, the bounding box may correspond to a region of pixels or individual sensors on the image sensor 250. In some implementations, the bounding box may be dynamically resized and/or reshaped with subsequent HDR images that reveal the location of one or more light sources. For example, if the HDR image 435 is captured while the LED light source is in an ON state 315, the bounding box may be resized or reshaped to fit the actual size of the light source. In this embodiment, the bounding box regions are fitted to be more accurate, so as not to include unnecessarily large regions of the image sensor 250.

At block 735, the method 700 communicates the bounding box data to the camera 115. In some implementations, the bounding box data identifies regions of pixels or individual sensors on the image sensor 250 that will have a different exposure time than the rest of the sensors. For example, the ISP 235 may receive the bounding box data, and increase the exposure time of the regions of sensors in the image sensor 250 that are contained by the one or more bounding boxes.

At block 740, the method 700 updates the exposure time of the sensors in regions of the image sensor 250 according to the bounding box data. In some implementations, the perception module 225 may generate bounding boxes in regions that have less edges than other regions of the HDR image 435, or regions where edges commonly terminate. These regions may indicate regions of the HDR image 435 that are over- or under exposed. In such an implementation, the perception module 225 may send bounding box data to the ISP 235, where the bounding box data contains the regions that have less edges than other regions of the HDR image 435, or regions where edges commonly terminate. In response, the ISP 235 may increase or decrease the exposure time of the individual sensors of the image sensor 250 that are contained within the one or more bounding boxes.

Implementing Systems and Terminology

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "pixel" or "sensor" may include multiple photosensitive elements, for example a photogate, photoconductor, or other photodetector, overlying a substrate for accumulating photo-generated charge in an underlying portion of the substrate.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for regionally controlling exposure time, comprising:
   a sensor array comprising a plurality of sensors and configured to generate a plurality of images, wherein each of the plurality of images is generated under different exposure conditions; and
   a processor coupled to the sensor array and configured to:
      determine one or more weight values for each image in the plurality of images;
      combine the plurality of images into a single image based on a comparison of the one or more weight values for each image;
      identify an object in the single image, wherein the object comprises a light emitting diode (LED) having an ON duration and an OFF duration;
      determine a region of sensors of the plurality of sensors corresponding to the identified object;
      generate a clock cycle that operates in sync with the ON duration and the OFF duration of the LED; and
      determine an exposure condition of one or more sensors within the region of sensors based, at least in part, on the ON duration of the LED.

2. The apparatus of claim 1, wherein identifying the object further comprises determining a number of edges in the single image, wherein the number of edges indicate the boundaries of the object.

3. The apparatus of claim 1, wherein the processor is further configured to generate a bounding box based on the identified object in the single image, and wherein the bounding box comprises at least a portion of the identified object.

4. The apparatus of claim 3, wherein the bounding box corresponds to the region of sensors of the plurality of sensors.

5. The apparatus of claim 1, wherein the determined exposure condition corresponds to the ON duration of the clock cycle.

6. The apparatus of claim 1, further comprising an object database, the object database configured to store a plurality of objects.

7. The apparatus of claim 6, wherein the processor is further configured to identify at least one object of the plurality of objects that corresponds to the identified object in the single image.

8. A method for regionally controlling exposure time on an image sensor, comprising:
generating a plurality of images via the image sensor, the image sensor comprising a plurality of sensors, and wherein each of the plurality of images is generated under different exposure conditions;
determining one or more weight values for each image in the plurality of images;
combining the plurality of images into a single image based on a comparison of the one or more weight values for each image;
identifying an object in the single image wherein the object comprises a light emitting diode (LED) having an ON duration and an OFF duration;
determining a region of sensors of the plurality of sensors corresponding to the identified object;
generate a clock cycle that operates in sync with the ON duration and the OFF duration of the LED; and
determining an exposure condition of one or more sensors within the region of sensors based, at least in part, on the ON duration of the LED.

9. The method of claim 8, wherein the processor is further configured to generate a bounding box based on the identified object in the single image, and wherein the bounding box comprises at least a portion of the identified object.

10. The method of claim 9, wherein the bounding box corresponds to the region of sensors of the plurality of sensors.

11. The method of claim 8, wherein the determined exposure condition corresponds to the ON duration of the clock cycle.

12. The method of claim 8, further comprising an object database, the object database configured to store a plurality of objects.

13. The method of claim 12, wherein the processor is further configured to identify at least one object of the plurality of objects that corresponds to the identified object in the single image.

14. An apparatus for regionally controlling exposure time, comprising:
means for generating a plurality of images, wherein each of the plurality of images generated under different exposure conditions;
means for determining one or more weight values for each image in the plurality of images;
means for combining the plurality of images into a single image based on a comparison of the one or more weight values for each image;
means for identifying an object in the single image, wherein the object comprises a light emitting diode (LED) having an ON duration and an OFF duration;
means for determining a region of sensors of the plurality of sensors corresponding to the identified object;
means for generating a clock cycle that operates in sync with the ON duration and the OFF duration of the LED; and
means for determining an exposure condition of one or more sensors within the region of sensors based, at least in part, on the ON duration of the LED.

15. The apparatus of claim 14, wherein:
the means for generating is an image sensor;
the means for determining is a processor;
the means for combining is the processor; and
the means for identifying is the processor.

16. The apparatus of claim 14, wherein the means for identifying is further configured to generate a bounding box based on the identified object in the single image, and wherein the bounding box comprises at least a portion of the identified object.

17. The apparatus of claim 16, wherein the bounding box corresponds to the region of sensors of the plurality of sensors.

18. The apparatus of claim 14, wherein the determined exposure condition corresponds to the ON duration of the clock cycle.

19. The apparatus of claim 14, further comprising an object database, the object database configured to store a plurality of objects.

20. The apparatus of claim 19, wherein the means for identifying is further configured to identify at least one object of the plurality of objects that corresponds to the identified object in the single image.

21. A non-transitory, computer-readable medium comprising instructions that, when executed by a processor of an apparatus, cause the apparatus to:
generate a plurality of images, via a sensor array comprising a plurality of sensors, wherein each of the plurality of images is generated under different exposure conditions;
determine one or more weight values for each image in the plurality of images;
combine the plurality of images into a single image based on a comparison of the one or more weight values for each image;
identify an object in the single image, wherein the object comprises a light emitting diode (LED) having an ON duration and an OFF duration;
determine a region of sensors of the plurality of sensors corresponding to the identified object;
generate a clock cycle that operates in sync with the ON duration and the OFF duration of the LED; and
determine an exposure condition of one or more sensors within the region of sensors based, at least in part, on the ON duration of the LED.

22. The non-transitory, computer-readable medium of claim 21, wherein execution of the instructions causes the apparatus to generate a bounding box based on the identified object in the single image, and wherein the bounding box comprises at least a portion of the identified object.

23. The non-transitory, computer-readable medium of claim 22, wherein the bounding box corresponds to the region of sensors of the plurality of sensors.

24. The non-transitory, computer-readable medium of claim 21, wherein the determined exposure condition corresponds to the ON duration of the clock cycle.

\* \* \* \* \*